(12) United States Patent
Howes

(10) Patent No.: US 9,425,719 B2
(45) Date of Patent: Aug. 23, 2016

(54) TRANSMISSION OF ENERGY

(71) Applicant: Isentropic Ltd., Hampshire (GB)

(72) Inventor: Jonathan Sebastian Howes, Hampshire (GB)

(73) Assignee: ENERGY TECHNOLOGIES INSTITUTE LLP, Leicestershire (GB)

( * ) Notice: Subject to any disclaimer, the term of this patent is extended or adjusted under 35 U.S.C. 154(b) by 8 days.

(21) Appl. No.: 14/397,799

(22) PCT Filed: Mar. 11, 2013

(86) PCT No.: PCT/GB2013/050594
§ 371 (c)(1),
(2) Date: Oct. 29, 2014

(87) PCT Pub. No.: WO2013/164565
PCT Pub. Date: Nov. 7, 2013

(65) Prior Publication Data
US 2015/0084567 A1   Mar. 26, 2015

(30) Foreign Application Priority Data

Apr. 30, 2012   (GB) .................................. 1207494.4

(51) Int. Cl.
*G05B 5/00* (2006.01)
*H02P 6/00* (2016.01)
(Continued)

(52) U.S. Cl.
CPC ................ *H02P 6/001* (2013.01); *H02K 7/116* (2013.01); *H02K 7/1807* (2013.01); *H02P 9/06* (2013.01); *H02P 9/10* (2013.01); *H02P 23/183* (2016.02); *H02K 2213/09* (2013.01)

(58) Field of Classification Search
CPC ..... G05B 19/058; H02J 3/46; H02K 2213/09; H02P 9/10
See application file for complete search history.

(56) References Cited

U.S. PATENT DOCUMENTS 4,352,024 A   9/1982   Geary et al.
5,872,435 A   2/1999   Bolte et al.
(Continued)

FOREIGN PATENT DOCUMENTS

EP   1615330   1/2006
WO   2009011615   1/2009
(Continued)

OTHER PUBLICATIONS

European Search Report in British Patent Application No. GB1207494.4, dated Aug. 17, 2012, 5 pages.
(Continued)

*Primary Examiner* — Karen Masih
(74) *Attorney, Agent, or Firm* — Lempia Summerfield Katz LLC

(57) ABSTRACT

Apparatus for transmitting energy comprising an electrical machine arranged to convert between electrical and mechanical energy, and comprising a rotor (20) and control means (42, 44, 90) arranged to regulate the motion of the rotor to ensure that the power angle of the electrical machine is maintained within a range of a predetermined power angle. A signal generator (2, 6), such as a synchronous machine and associated flywheel, may generate a reference signal relating to the predetermined power angle and be powered by a frequency regulated electrical supply. The control means (42, 44, 90) may be a mechanical control linkage or servo control system and may regulate the output of the motion of the rotor in response to a change in its motion which the control means or a dedicated detection device detects. The electrical machine may be an electric motor, an electricity generator, or a machine switchable between motor and generator modes. The apparatus may generate electricity to supply to a power grid and/or store electricity supplied by a power grid, and the electrical machine may be a synchronous machine where the rotor requires regulation to accommodate grid fluctuations such as low voltage events so as to remain synchronized. The apparatus may comprise an energy storage system that supplies and/or receives power from a power grid.

19 Claims, 6 Drawing Sheets

(51) Int. Cl.
*H02P 9/06* (2006.01)
*H02K 7/116* (2006.01)
*H02K 7/18* (2006.01)
*H02P 9/10* (2006.01)

(56) References Cited

U.S. PATENT DOCUMENTS

2009/0091303 A1 4/2009 Schweitzer, III et al.
2010/0140940 A1* 6/2010 Kammer ............... F03D 7/0224
290/44
2011/0234179 A1 9/2011 Hehenberger
2011/0278858 A1 11/2011 Hehenberger

FOREIGN PATENT DOCUMENTS

WO 2010063052 6/2010
WO 2011070520 6/2011

OTHER PUBLICATIONS

International Search Report and Written Opinion in corresponding PCT Application No. PCT/GB2013/050594, dated Dec. 11, 2013, 15 pages.

* cited by examiner

TRANSMISSION OF ENERGY

RELATED APPLICATION DATA

This U.S. national phase application is based on international application no. PCT/GB2013/050594, filed on Mar. 11, 2013, which claimed priority to British national patent application no. 1207494.4, filed on Apr. 30, 2012. Priority benefit of these earlier filed applications is hereby claimed.

The present invention concerns improvements to apparatus for the transmission of energy. In particular, the invention concerns apparatus and methods for controlling power and torque, and also reducing the risk of pole slipping of a coupled electric machine in relation to electricity generation, supply and storage.

In conventional electricity generation, an electrical machine operating as an electricity generator is driven by a drive shaft, connected to the rotor of the electrical machine, which is powered by a power source such as a turbine (for example, a wind or a water turbine), a diesel engine or a gas engine. The generated electricity may be supplied directly to the electricity distribution system, commonly known as a "power grid".

Alternatively, energy may be released from an energy storage machine, such as a pumped heat electricity storage (PHES) machine or a pumped hydro turbine, to rotate the drive shaft of the electrical machine and generate electricity, which may be supplied directly to the electricity distribution system.

The rotor of the electrical machine carries a magnetic field which rotates within a stator. As the rotor rotates, the magnetic field it carries passes by coils of wire wound into the stator and induces a voltage which is proportional to the magnetic field strength of the rotor and its speed of rotation.

If a first electrical machine is driven synchronously under zero load conditions by power taken from an electricity distribution system, its rotor will rotate at a speed that is an exact harmonic of the frequency of the distribution system dictated by the number of poles of the electrical machine. If a second electrical machine of the same pole count is connected to the same distribution system and is driven as a generator, then the rotor of this second machine will lead the rotor of the first machine by an angle that is proportional to the torque applied to drive the second machine. Assuming that the frequency of the electricity distribution system is constant, the torque and power applied to the second machine will be in a fixed relationship. This angle is defined as a "torque angle" or a "power angle". Similarly, if the second machine is driven by power from the distribution system then the rotor of the second machine will lag the rotor of the first machine by a power or torque angle that is proportional to the torque or power load imposed on the second machine.

In the case of an electrical machine operating as a generator, if the load presented by the electricity distribution system increases, the torque load on the electrical machine increases. As this is a constant frequency system, a given driving torque represents a given power, the increase in torque on the electrical machine will therefore cause the driving machine to slow down, which will reduce power angle. To respond to the increase in load demand, power angle must be restored and hence torque and so power must increase.

Electricity distribution systems are susceptible to faults, which lead to low voltage events. In such an event the voltage applied to the electric machine by the electricity distribution system drops very rapidly. This reduces the force opposing rotation of the rotor. When such an event occurs when the machine is operating as a generator, the power source supplying power to the generator to rotate the rotor will continue to supply torque, but the generator is now in a state where it is unable to absorb torque and consequently there is less force opposing movement of the rotor. The sudden drop in force results in both the power source and the rotor accelerating and consequently an increase in the rotation rate of the rotor and the drive shaft.

If this increase in the speed of rotation of the generator and drive shaft persists for a long enough period of time, the power angle may increase to a point where the rotor is attracted to the next pole of the magnetic field generated by the stator. In a typical four-pole synchronous motor, a power angle approaching 90° or more will result in the rotor "pole slipping" to the next pole of the magnetic field generated by the stator.

Pole slipping typically causes the generator to lose synchronicity with the electricity distribution system and may damage the associated machinery. For example, sudden changes in the torque load on the rotor drive shaft may cause a torsional overload of the rotor or drive shaft.

The ability of apparatus to overcome a low voltage event as described above is referred to in the art as "low voltage ride through" (LVRT) capability.

The operators of many electricity distribution systems require that electricity generators above a certain size must stay connected to their electricity distribution network during a low voltage event. This way, as the voltage drops, the generators contribute "fault current". This fault current helps to isolate the fault in the electricity distribution system that is causing the voltage drop. It also serves to reduce the size of the voltage drop by delivering at least some electricity to the distribution system during the low voltage event. By staying connected to the distribution system, the fault current enables the system voltage to recover much more quickly after the event. If multiple generators trip out during a fault then this in turn puts more strain on the remaining generators that are still connected as the system voltage starts to fall. In extreme circumstances it can lead to a cascade failure where more and more generators trip out as the system voltage falls further.

Large generator units are able to stay on-line during low voltage events by virtue of their residual inertia and their location on the power grid. Essentially, the rotor of a large generator has sufficient spinning inertia that its speed does not significantly change within the normal timeframe of a low voltage event. Furthermore, the voltage drop seen by large generators connected, normally via a step-up transformer, to the high voltage power grid is relatively low as the impedance of the network, wires and transformers all reduces the magnitude of the voltage drop. However, distributed generation systems (including distributed storage systems) are normally connected directly to a low and medium voltage network. Consequently, if there is a fault that is located close to the point of connection to the power grid then it is likely that there is less impedance between the fault and the generator. The result is that the voltage drop seen by the generator is likely to be significantly greater for small distributed generation than for large generators.

It is a common requirement of electricity distribution systems that an electricity generator above a certain size stays on line for at least 150 milliseconds, for example. This timeframe typically varies depending upon the country and the relevant grid compliance code. This is enough time for breakers to isolate the fault. If the low voltage event lasts for longer than 150 milliseconds then the problem is likely to take significant time to clear and the generator will need to be taken off-line. For example if the fault is between a generator and the electricity distribution system, the tripping of breakers will isolate both the generator and the fault from the grid. It is also a further requirement that the generator not only stays on line while the voltage drops, but also as the voltage rises and effectively tracks it back up.

To overcome the problem of pole slipping in smaller, diesel-powered generators, these generators comprise means to monitor an electricity generator electronically and regulate fast response injectors to change the amount of fuel injected into the cylinders of the engine in order to reduce the power of the engine as the voltage of the electricity distribution system drops. However, this solution does not work for engines with manifolds or that do not use spray injected fuel.

For example, where the generator comprises a gas engine, the problem of pole slipping and preventing the associated damage is controlled by conventional throttling of the engine. However, the power of a gas engine is only effectively reduced when all of the gas in the manifold of the gas engine has been used up. Consequently, smaller gas engines currently have a problem meeting LVRT requirements and normally trip out when a low voltage event occurs. Therefore, they cannot meet the grid code requirements.

Wind-powered generators are particularly prone to rapid changes in their power output due to changes in wind speed. Therefore, maintaining synchronicity with an electricity distribution system is a particular problem for wind-powered generators. This problem is currently tackled by using power electronics or a DFIG (double fed induction generator). However, both of these solutions have an energy penalty in that the conversion efficiency from mechanical to electrical power is lower than if a synchronous generator was used.

In a typical low voltage event, as the voltage drops it is necessary to reduce the power, and hence driving torque of the prime mover if the same power angle is to be maintained. After the fault is isolated by circuit breakers, the voltage of the electricity distribution system will start to rise. If the power input via the prime mover has been reduced, then as the system voltage rises the power angle will drop. In this condition the electrical machine is now putting much less power in to the electricity distribution system.

The above problem of pole slipping and the consequent damage to equipment is also found when electricity is stored in an energy storage machine, such as a pumped heat electricity storage (PHES) machine or a pumped hydro turbine, for use at a later time. In this arrangement, an electrical machine operates as an electric motor. When operating as an electric motor a voltage is supplied to the electrical machine resulting in a rotating magnetic field in the stator which serves to rotate the rotor. Typically, a drive shaft is rotated by the rotor. When there is no load on the drive shaft, the rotor rotates freely and there is effectively a power angle of 0° (ignoring bearing friction etc.).

When a load is placed on the drive shaft, for example, when coupled to an energy storage machine arranged to convert the rotational energy of the drive shaft into stored energy, the rotor magnetic field lags the magnetic field generated by the stator. Therefore, the interaction between the magnetic field generated by the stator and the magnetic field generated by the rotor produces a resultant magnetic field. The difference between the resultant magnetic field and the magnetic field of the rotor is the "power angle", as in the generation mode described above. However, when operating as an electric motor the rotor magnetic field lags the resultant magnetic field.

The invention aims to overcome at least some of the problems and limitations of the apparatus and methods of the prior art by providing, according to a first aspect, apparatus for transmitting energy, the apparatus comprising an electrical machine arranged to convert between electrical energy and mechanical energy, the electrical machine comprising a rotor, and control means arranged to regulate the motion of the rotor to ensure that the power angle of the electrical machine is maintained within a range of the predetermined or desired power angle.

In a low voltage event, or any event where there is a potential for pole slipping, the apparatus ensure that the power angle of the electrical machine remains within a range (e.g. substantially at or around the predetermined power angle).

In a preferred embodiment, the apparatus further comprises a signal generator arranged to generate a reference signal relating to the predetermined power angle. When the apparatus is being used to generate electricity for supply to an electricity distribution network, a low voltage event will likely result in an increase in the power angle. Conversely, when the apparatus is being used to store electricity supplied from a distribution network, a low voltage event is also likely to result in the power angle of the electrical machine diverging from the predetermined power angle, but in the opposite angular direction. The apparatus serves to increase or reduce the speed of the rotor of the electrical machine to maintain the power angle within a range of the desired power angle, where the signal generator essentially provides the reference power angle.

The signal generator may be powered by a frequency regulated electrical supply, for example, an electricity distribution network. The reference signal provides a reference to the predetermined power angle in the event of a fluctuation in the operating frequency of an electricity distribution system. However, the power angle of the electrical machine may vary slightly due to factors affecting the power load. For example, if a change in the motion of the rotor is detected, which would indicate a change in the power angle of the electrical machine, the invention serves to reduce or increase the output of a power source, as necessary, to maintain the power angle within a range. The range is an acceptable tolerance and may be within +/−20% of the predetermined power angle, and preferably within +/−5% of the predetermined power angle. This reduces the risk that the power angle does not exceed 90° resulting in pole slipping, and the electrical machine maintains synchronicity with the electricity distribution system and that the risk of damage to the apparatus or associated equipment is minimised.

In normal operation when connected to an electricity distribution system the invention also ensures that the output of the electrical machine does not vary. The predetermined power angle effectively equates to a predetermined power output, which may be compatible with the electricity distribution system. The control means may be arranged to ensure that the electrical machine generates the predetermined power output. The invention therefore acts to solve the problem associated with low voltage events, and also controls the power output or input during energy transmission.

The invention provides the desirable feature that the power output of a power source is reduced in proportion to the voltage drop in the grid during a low voltage event. This has the benefit that the electrical machine and hence power source remain synchronised with the grid and the electrical machine is protected during the low voltage event. This enables the power output by the power source to be increased in harmony with the rise in voltage of an electricity distribution network as a low voltage event ends.

A further advantage of the invention is that for synchronous machinery connected to an electricity distribution system, it is possible to choose the power factor at which the electrical machine operates. This means that in addition to the power the electrical machine supplies to the electricity distribution system, the power output by the machinery can be increase or decreased by a "reactive power". This addition or subtraction of reactive power allows the power angle to vary depending upon the power converted by the electrical machine. It means that for a certain real power setting the power angle varies. Therefore, the apparatus may be arranged to provide feedback when selecting a power angle such that the angle is adjusted until the desired real power output is achieved at that power factor. The power angle for a certain power setting may vary slightly if the power factor of the machinery changes.

The invention may be used wherever energy is transmitted from a source to a destination device. As indicated above, the apparatus may be arranged to generate and/or supply electricity to an electricity distribution system. Accordingly, the apparatus may be used in the generation of electricity by the electrical machine operating as an electricity generator, wherein the electricity is supplied to the electricity distribution system. In a preferred embodiment, the electrical machine is powered by a power source, and the control means is arranged to control the power source. The apparatus may comprise an energy storage system, such as a pumped heat electricity storage (PHES) machine or a pumped hydro turbine where the turbine acts as the power source when driven by water flowing from a higher reservoir to a lower reservoir. The electrical machine may be powered by the power source to generate electricity for supply to the electricity distribution system. Alternatively, the power source may comprise a wind turbine or an internal combustion engine, such as a diesel engine, or a gas engine.

Equally, the invention may be used in the storage of energy. For example, the invention may be used to transmit excess electricity from the electricity distribution system to an energy storage machine, which may be one or more of those described above. In a preferred embodiment, the electrical machine is powered by electricity from a power grid, and the apparatus may comprise an energy storage system, such as a pumped heat electricity storage (PHES) machine or a pumped hydro turbine where the turbine pumps water from a lower reservoir to a higher reservoir. In this embodiment, the control means is arranged to control the energy storage system and maintain the power angle of the electrical machine within a range of the power angle of the power grid. In alternative embodiments, rather than a hydro turbine the apparatus may comprise an air conditioning system, a compressor driven by a synchronous motor or a water pump for mains water.

The electrical machine may be designed to run only as an electric motor, only as an electricity generator, or, as a combination motor/generator that can change between motor mode and generator mode when necessary, such that the power angle is regulated within a region comprising positive or negative power angles (e.g. full positive torque to full negative torque) either side of the mid-point (zero torque). The electrical machine may be a synchronous or inductive machine.

In a preferred embodiment, the control means may be arranged to regulate the output of the power source in response to a change in the motion of the rotor. In a further preferred embodiment, the control means or a dedicated detection device may be arranged to detect the change in the motion of the rotor.

The rotor may be arranged such that a change in its movement is reflected in the position or movement of a control member. The control member may be a regulation shaft which may be arranged to regulate the output of a power source. Preferably, the regulation shaft and the rotor may be connected via the control means. The control means may be connected to, or in communication with, the signal generator and the rotor and any change in their relative movement may be reflected in the control means. The control means may comprise the control member. The control means may then be used to control the output of a power source. Advantageously, the change in the relative movement of the control means and/or the rotor may be transmitted into a relative change in the output of the power source. The control member may be connected directly to power control apparatus of the power source.

The apparatus may comprise an intermediate gear or spool, which may be driven by the signal generator. The control means may comprise a dog mounted on the intermediate gear or spool and retained within a slot on a drive disk. The regulation shaft may control the power output of the power source. The regulation shaft may comprise or drive a camshaft of the power source. This approach is helpful for changing the power output of a diesel engine by changing the engine's timing when the power source is a diesel engine. Alternatively, the electric machine may be powered by a heat engine, the output of which may be regulated by changing the fuel supply in the heat engine. The electric machine may be powered by a wind turbine the output of which may be regulated by changing the blade angle of the blades of the turbine. The regulation shaft and the rotor may be connected to a control arm by a planetary gear system. This may be appropriate where it is desirable to return a linear control signal to the power source.

The signal generator may be connected to the control means to transmit the reference signal directly to the control means. Preferably, the reference signal is a constant signal relating to the predetermined power angle.

Preferably, the rotor may be connected or coupled to a prime mover shaft which may be a drive shaft or a crank shaft. A change in the motion of the rotor may be transmitted into a relative change in the output of the power source. The control means may directly control power control apparatus of the power source.

The signal generator may comprise a synchronous reference motor which is arranged to provide the reference signal and may comprise a flywheel driven by the synchronous motor. The synchronous reference motor may be much smaller than the electrical machine. The flywheel may be sufficiently large relative to the synchronous reference motor such that the speed of the rotor of the synchronous reference motor does not vary significantly over a low voltage event. In normal operation the synchronous reference motor driving the flywheel will be in a steady state condition and will be operating at close to zero power angle with respect to the electrical power source frequency. The flywheel may be directly integrated into the rotor of the synchronous reference motor. The advantage of a close to zero power angle is that the motor will be, to a large extent, unaffected by power grid voltage disturbances. When coupled with a flywheel the combined effect is that the signal generator will be unaffected by any disturbance on the electricity distribution network that is effecting the main electrical machine, thereby isolating the signal generator from any transient disturbances that arise from either the electrical machine or the power grid. The action of the flywheel (spinning at the grid frequency or a related frequency e.g. a harmonic) ensures that the reference signal remains steady.

In another embodiment, the signal generator may consist of an electrical motor and a variable speed drive or constant frequency drive. In this configuration, the drive is normally synchronised with the frequency of the power grid as the reference, but is capable of maintaining an accurate output signal in the event of a low voltage event.

In an alternative embodiment of the invention, the control means may be arranged to regulate the output of the power source so that the power angle is maintained at the predetermined power angle. The control means may have a control frequency which may be related to the predetermined power angle.

According to a second aspect, the invention also resides in a method of transmitting energy, the method comprising rotating the rotor of an electrical machine using power generated by a power source, and regulating the motion of the rotor so that the power angle of the electrical machine is maintained within a range of a predetermined power angle.

As discussed above, the electrical machine may be designed to run as an electric motor, as an electricity generator or as a combination motor/generator that can change between motor mode and generator mode when necessary. When used as an electric motor a voltage, which may be supplied by an electricity distribution system, is applied to the electrical motor which rotates the rotor which may be connected to a PHES system, for example. When used as an electric generator a mechanical force acts to rotate the rotor to generate electricity which may be supplied to an electricity distribution system. Preferably, the reference signal is used to maintain the power angle of the electrical machine within a range of the predetermined power angle.

It will be readily apparent to the skilled person that elements of one or more of the above aspects may be combined with elements of one or more of the other aspects of the present invention.

Presently preferred embodiments of the present invention will be described, by way of example only, with reference to the following drawings, in which:—

FIG. 1b is a front view of the apparatus of FIG. 1a;

Figure 1B:
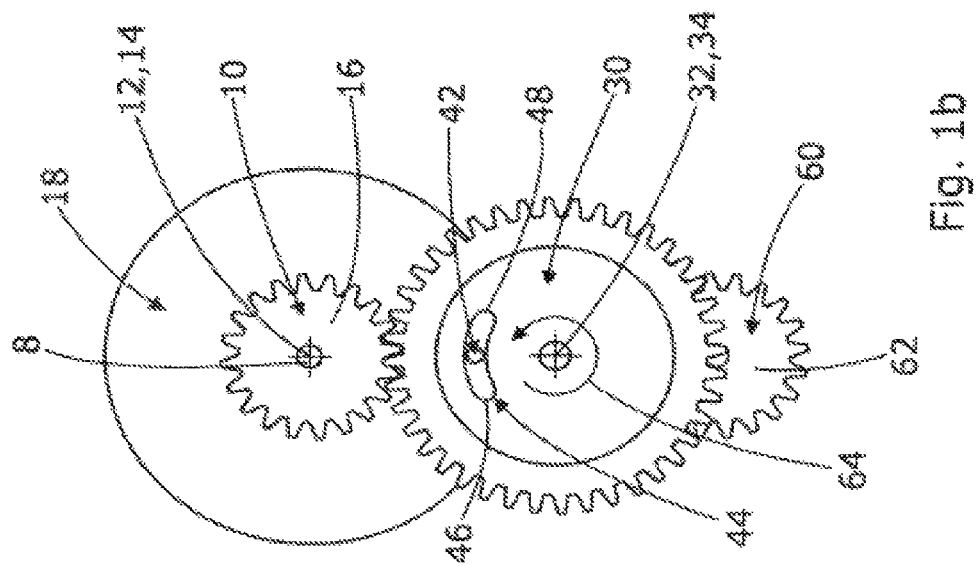

Apparatus according to the first embodiment of the present invention is now described with reference to FIG. 1a and FIG. 1b.

A synchronous electric motor 2 is conventionally powered by mains electricity supplied by an electrical distribution system (not shown). The electric motor 2 comprises a motor housing 4 within which is contained a rotor and a stator (not shown). A motor shaft 6 is connected to the rotor and extends from the housing 4 and terminates at a motor shaft face 8 at the end of the motor shaft 6. In use, the motor 2 is arranged so that the motor shaft 6 rotates at a constant synchronous frequency defined by the electrical distribution system. A motor spur gear 10 is mounted on the motor shaft 6 coaxially with respect to the rotational axis 12 of motor shaft 6 and the rotational axis 14 of the motor spur gear 10, so that the spurs of the motor spur gear 10 extend radially with respect to the rotational axis 12 of the motor shaft 6 and the rotational axis 14 of the motor spur gear. An outer face 16 of the motor spur gear 10 is coplanar with the motor shaft face 8.

A flywheel 18 is mounted on the motor shaft 6 between the motor housing 4 and the motor spur gear 10 to increase the moment of inertia of the electric motor 2 when in use. As is conventional, the flywheel 18 is arranged so that the rotational axis of the flywheel is coaxial with the rotational axis 12 of the motor shaft 6.

The apparatus also comprises a prime mover shaft 20 which is driven by a power source. In the presently described embodiment the prime mover shaft 20 is a crank shaft 20 of a diesel engine (not shown) which rotates about its longitudinal axis. However, it will be immediately apparent to the skilled person that in alternative embodiments of the invention the prime mover shaft 20 may be driven by another power source, such as a PHES machine, a pumped hydro turbine or a wind turbine, for example.

The crankshaft 20 extends from the diesel engine coaxially through an elongated tubular bearing 22, in which the diameter of the crankshaft 20 matches the internal diameter of the tubular bearing 22. The tubular bearing 22 has a first opening 24 at a first end 25 and a second opening 26 at a second end 27, and the crankshaft extends into the first opening 24, through the interior of the tubular bearing 22 and out of the second opening 26. The crankshaft 20 extends from the second opening 26 to an electrical machine operating as an electricity generator (not shown). The crankshaft 20 is coupled to the rotor of the electrical machine which is driven by the crankshaft 20 to supply electricity to an electrical distribution network (not shown), which may be the network powering the motor 2.

A regulation shaft 28 is arranged to regulate the power generated by the power source. In the presently described embodiment the regulation shaft 28 is part of the camshaft 28 of the diesel engine. As the camshaft 28 rotates it opens and closes the valves of the diesel engine. The timing of the opening and closing of the valves may be regulated by changing the speed of rotation of the camshaft. However, it will be immediately apparent to the skilled person that in alternative embodiments of the invention the regulation shaft 28 may regulate the power of other power sources, such as a PHES machine, a pumped hydro turbine or a wind turbine.

A drive disk 30 is mounted on the crankshaft 20 coaxially with respect to the rotational axis 32 of the drive disk and the rotational axis 34 of the crankshaft 20. The drive disk 30 is located adjacent to the second end 27 of the tubular bearing 22.

A bearing arm 36 extends from the outer surface of the tubular bearing 22, and is perpendicular to the longitudinal axis of the tubular bearing 22. The bearing arm 22 has a first face 38 and a second face 40, wherein the second face 40 is coplanar with the second end 27 of the tubular bearing 22. The bearing arm 22 extends upwards and parallel to the plane of the drive disk 30. A protrusion 42 extends perpendicularly from the second face 40 of the bearing arm 36 and through a curved slot 44 in the drive disk 30. The slot 44 extends from a first slot end 46 along a path defined by a constant radius from the centre of the drive disk 30 to a second slot end 48. The slot 44 extends by an arc defined by the maximum and minimum acceptable power angles. Damping means is provided between the protrusion 42 and the first slot end 46 and the second slot end 48 to allow tuning of the response for a particular application. The damping means comprises a first spring (not shown) located between the protrusion 42 and the first slot end 46, and a second spring (not shown) located between the protrusion 42 and the second slot end 48.

Since the bearing arm 36 is mounted on the tubular bearing 22, the bearing arm 36 may move relative to the drive disk 30. Accordingly, the protrusion 42 is free to move within the slot 44. However, rotation of the bearing arm 36 relative to the drive disk 30, and therefore the crank shaft 20, is restricted by the protrusion 42 abutting on either the first spring located at the first slot end 46 or the second spring located at the second slot end 48. The protrusion 42 and the slot 44 are arranged to act as a dog to restrict rotational movement of the bearing arm 36 with respect to the drive disk 30.

Mounted on the outer surface of the tubular bearing 22 is a first bearing spur gear 50 and a second bearing spur gear 52. The first bearing spur gear 50 has a first face 54 and a second face 56. The first face 54 of the first bearing spur 50 is coplanar with the first end 25 of the tubular bearing 22. The first bearing spur gear 50 and the second bearing spur gear 52 are each mounted on the tubular bearing 22 coaxially with respect to the rotational axes of each of the first bearing spur gear 52 and the second bearing spur gear 52, and the tubular bearing 22. Accordingly, the spurs of the first bearing spur gear 50 and second bearing spur gear 52 extend radially with respect to the longitudinal axis of the tubular bearing 22.

The second bearing spur gear 52 is located on the tubular bearing 22 between the first bearing spur gear 52 and the bearing arm 36. The spurs of the second bearing spur gear 52 are arranged to mesh with the spurs of the motor gear 10 which has a smaller diameter than the second bearing spur gear 52. The gear ratio of the second bearing spur gear 52 and the motor gear 10 are arranged to maintain synchronicity between the synchronous electric motor 2 and the generator.

The camshaft 28 extends from the diesel engine to a camshaft face 58 at the end of the camshaft 28. A camshaft spur gear 60 is mounted on the camshaft 28 coaxially with respect to the rotational axes of camshaft spur gear 60 and the camshaft 28, so that the spurs of the camshaft spur gear 60 extend radially with respect to the longitudinal axis of the camshaft 28. An outer face 62 of the camshaft spur gear 60 is coplanar with the camshaft face 58. The spurs of the camshaft spur gear 60 mesh with the spurs of the small bearing spur gear 50.

When the apparatus is initiated to supply electricity to the electricity distribution system the diesel engine, synchronous motor and electricity generator are initiated by an external means at the same time and their speed and power are increased in a synchronous manner until the frequency of the synchronous motor relates to a predetermined power angle. Alternatively, a clutching mechanism (not shown) may be located on the crankshaft 20 adjacent to the electricity generator. In this alternative embodiment, the diesel engine and synchronous motor are initiated at the same time and brought into harmony with the electricity distribution system before engaging with the electricity generator using the clutch mechanism.

During normal operation, the frequency of the motor 2 provides a reference power angle. The flywheel 18 ensures that the motor shaft 6 has a large enough rotational inertia to ensure that the rate of rotation, and therefore its frequency, remains substantially constant during minor disruptions to the power supplied to the motor 2.

The motor 2 drives the motor spur gear 10 which, in turn, drives the second bearing spur gear 52. The second bearing gear 52 thus drives the bearing 22 and rotates the bearing arm 36 about the crank shaft 20. Concurrently with the motor 2, the diesel engine drives the crank shaft 20 which turns the drive disk 30 in the direction indicated by drive disk arrow 64. The speed of the diesel engine and the speed of the motor 2 are such that the speed of rotation of the drive disk 30 matches the speed of rotation of the bearing arm 36 under normal operating conditions.

During electricity generation and supply, the electricity generator driven by the crank shaft 20 is connect to the electricity distribution system, the voltage of which produces a load on the rotor opposed to the direction of electricity generation. As discussed above, this effect results in a resultant magnetic field that lags the rotor magnetic field by a value known as the power angle. As the speed of the rotor increases, the load on the rotor increases and therefore the power angle increases.

The apparatus is arranged such that the speed of rotation, i.e. the frequency, of the crank shaft 20 matches the operating frequency of the electricity distribution system. This is the predetermined optimal frequency of operation of the apparatus which minimises stress on the apparatus.

The first bearing spur gear 50 rotates with the bearing 22 and drives the camshaft spur gear 60 which drives the camshaft itself 28. Under optimal conditions, when the speed of the crank shaft 20 matches the speed of the bearing arm 36, the camshaft 28 rotates at the appropriate speed to open and close the valves of the engine to produce sufficient power to overcome the residual force, and rotate the crank shaft 20 at the operating frequency of the electricity distribution system.

If there is a sudden voltage drop in the electricity distribution system the amount of electrical power that the generator can supply to the electricity distribution system is reduced. However, the engine continues to supply the same mechanical energy and will likely speed up due to the reduction in the residual force on the generator. This will result in an increase in the power angle.

In the present embodiment of the invention, the drive disk 30 speeds up relative to the bearing arm 36 and the slot second end 48 is urged against the protrusion 42. The speed of the protrusion 42 is controlled by speed of rotation of the bearing arm 22 which is ultimately controlled by the speed of the motor 2. As the engine speed increases, the speed of the motor 2 lags behind. The speed of the motor 2 is maintained at a relatively constant value due to the inertia of the flywheel 18 being much greater than the power of the motor 2. Therefore, the motor shaft 6 continues to rotate at a speed that is relatively constant over the time period of the low voltage event. Accordingly, the speed of the camshaft 28 lags the speed of the crank shaft 20 a proportional amount to the difference between the speed of the drive disk 30 and the bearing arm 36.

Since the camshaft 28 is made to lag the engine cycle, the camshaft 28 changes the timing at which at least some of the valves of the cylinders of the engine are opened and closed to reduce the power output of the engine. This power reduction may be achieved by holding the cylinder inlet valves open for longer so that a smaller charge of oxygen enters the cylinder, thereby reducing the power produced by the engine. The reduction in power continues until the slot second end 48 is no longer urged against the protrusion 42. At which point the frequency of the crank shaft 20 will match the frequency of the motor 2. The first and second springs ensure that relative movement of the protrusion may be maintained and provide a proportional change in the speed of the engine.

As an example, the diesel engine may be generating power at 50% of its total output which relates to a power angle of 45° under normal generating conditions. The motor shaft 6 is therefore rotating at a speed which reflects a power angle of 45°. Under these conditions, the protrusion 42 is in the middle of the slot 44. During a low voltage event the protrusion 42 moves to the second slot end and the power angle increases as the rotor and engine speed up.

In a normal low voltage event, where the fault is isolated by circuit breakers, the voltage across the electricity distribution system will rise. The load on the generator will rise with the voltage. Consequently, the speed of the engine will slow down. In this situation, the protrusion 42 is urged against the first slot end 46, resulting in the camshaft 28 leading the engine cycle. Accordingly, the camshaft 28 will act to change the opening and closing of the valves in such a way that it increases the power output of the engine until the protrusion 42 is no longer urged against the first slot end 46 and the crank shaft 20 rotates at the same frequency as the electricity distribution network.

This arrangement allows for effective control of the power output of the engine without providing significant feedback to the motor shaft 6. This, together with the provision of the flywheel 18 to provide rotational inertia, allows the motor shaft 6 to provide an effective reference frequency relating to the reference power angle even if the motor 2 is interrupted by a low voltage event of the type discussed above.

In a second embodiment of the invention, the diesel engine may be replaced by a pumped heat electricity storage (PHES) machine which releases the energy stored within it by turning the prime mover shaft 20 which, in this alternative embodiment, is a conventional drive shaft rather than a crank shaft. The drive shaft rotates the rotor of the electric machine, as described above, to supply electricity to the electricity distribution system.

In the second embodiment, electricity may be supplied to the electric machine so that it behaves as an electric motor. Electricity supplied by the electricity distribution system rotates the rotor of the motor which in turn rotates the drive shaft 20. The drive shaft 20 is arranged with the PHES machine to pump heat from a first vessel of the PHES machine to a second vessel of the PHES machine to store the electric energy supplied by the electricity distribution system. This energy may be released back to the electricity distribution system at a later time.

When storing energy from the electricity distribution system, the synchronous motor 2 together with the gear arrangement and the bearing arm 36, protrusion 42 and drive disk 30 ensure that the drive shaft 20 does not over-rotate in a similar way as described above for electricity generation. Accordingly, energy storage takes place under controlled conditions reducing the risk of damage to the apparatus.

It will be readily apparent that other types of energy storage device may be used instead of or in conjunction with the PHES machine. For example, a pumped hydro turbine may be used.

In a third alternative embodiment of the invention, for example for use with wind turbines or water turbines, the regulation shaft 28 is geared to rotate at the same frequency as the prime mover shaft 20. Therefore, any movement of the protrusion 42 relative to the slot 44 signifies a change in the frequency of the prime mover shaft 20 relative to the frequency of the regulation shaft 28. The relative movement of the protrusion 42 in the slot 44 is proportional to the relative change in frequency of the prime mover shaft 20. This relative movement of the protrusion 42 in the slot 44 may be translated into a signal which is used to alter the blade pitch of a turbine, or apply a rotor brake associated with a turbine, such that pole slip is avoided and synchronicity with the electric distribution system is maintained.

When the apparatus is initiated to store electricity in a PHES system from an electricity distribution system, for example, the PHES system, synchronous motor and electrical machine are initiated by an external means at the same time and their speed and power are increased in a synchronous manner until the frequency of the synchronous motor relates to a predetermined power angle. Alternatively, a clutching mechanism (not shown) may be located on the crankshaft 20 adjacent to the electrical machine. In this alternative embodiment, the PHES system and synchronous motor are initiated at the same time and brought into harmony with the electricity distribution system before engaging with the electrical machine using the clutch mechanism.

Apparatus according to a fourth embodiment of the invention is now described with reference to FIG. 2. The fourth embodiment of the invention is arranged for use with a power source in which the power generated or released by the power source may be regulated linearly. As an example, FIG. 2 and the subsequent figures illustrate how a power source such as a PHES machine may be controlled by this embodiment of the invention. It will be clear to the skilled person that the current embodiment is not limited to PHES machines and other power sources, energy absorbers or energy storage machines may be used.

Figure 1A:
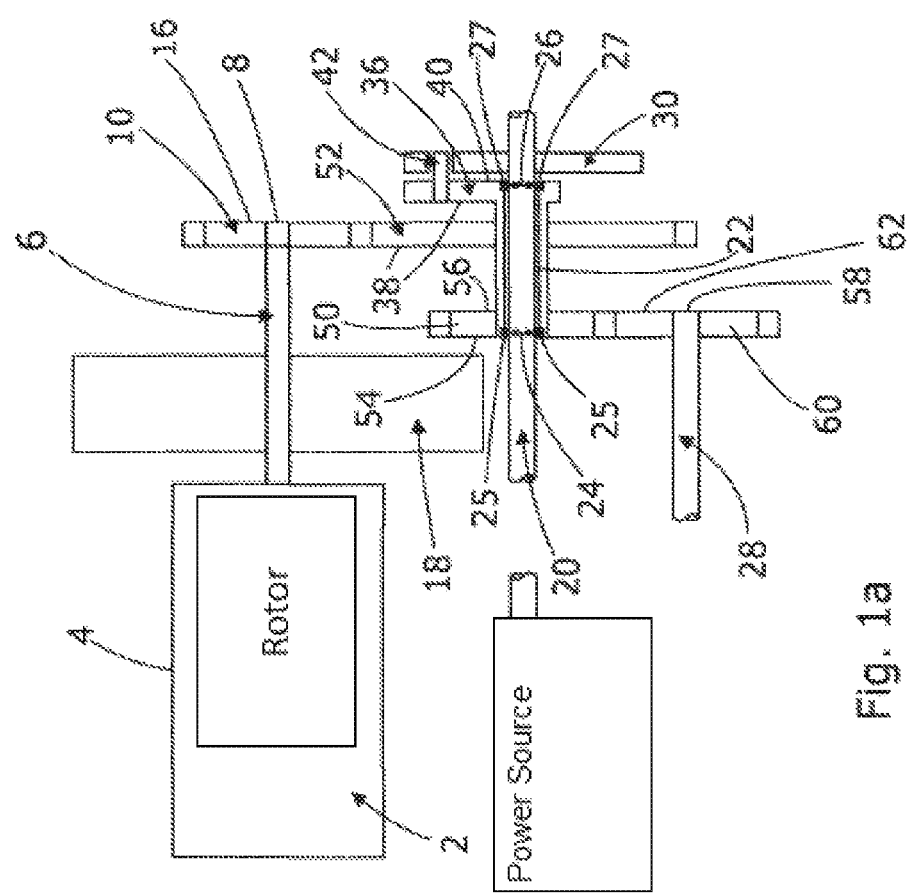
FIG. 1a is a side view of apparatus according to a first embodiment of the present invention.
Figure 2:
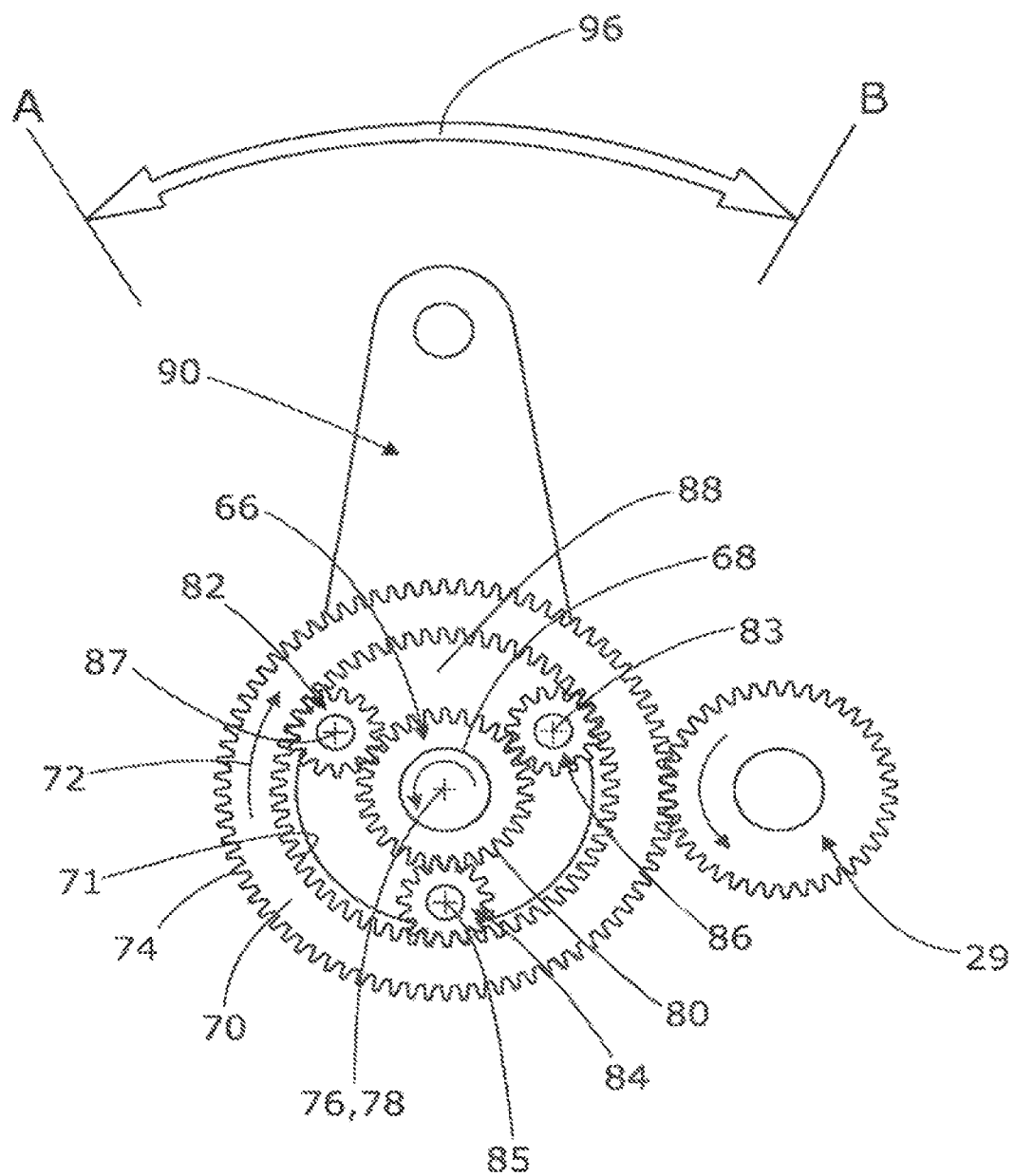
FIG. 2 is a diagram of apparatus according to an alternative embodiment of the present invention.

The apparatus shown in FIG. 2 differs from the apparatus shown in FIGS. 1a and 1b in that the prime mover shaft 20 drives a sun gear 66 in the direction of a first arrow 68, and the regulation shaft 28 is coupled to a regulation gear 29 which drives a ring gear 70 in the direction of a second arrow 72 at half the speed of the sun gear 66. In this embodiment, the prime mover shaft 20 is connected to a PHES machine (not shown) which is connected to an electrical machine operating as an electricity generator (not shown) that supplies electricity to an electricity distribution network (not shown). Alternatively, the electrical machine may operate as an electric motor to store energy from the electricity distribution network to the PHES machine.

The ring gear 70 has an internal ring surface 71 and an external ring surface 74. Sixty internal ring spurs extend inwardly from the internal ring surface 71 and eighty external ring spurs extend outwardly from the external ring surface 74. The diameter of the sun gear 66 is smaller than the diameter of the internal surface 71 of the ring gear 70. The sun gear 66 is located within the area defined by the internal ring surface 71, and the rotational axis 76 of the sun gear 66 is coaxial with the rotational axis 78 of the ring gear 70.

The sun gear 66 has thirty sun gear spurs that extend radially from a circumferential surface 80 with respect to the rotational axis 76 of the sun gear 66. A first planet gear 82, a second planet gear 84 and a third planet gear 86 are located in the area defined between the circumferential surface 80 of the sun gear 66 and the internal surface 71 of the ring gear 70. The first, second and third planet gears 82, 84, 86 are equally radially spaced within the area defined between the circumferential surface 80 of the sun gear 66 and the internal surface 71 of the ring gear 70, and are coplanar with the sun gear 66 and the ring gear 70. Each of the first, second and third planet gears 82, 84, 86 have fifteen planet gear spurs that extend radially with respect to the rotational axis 83, 85, 87 of the respective planet gear 82, 84, 86. The spurs of each planet gear 82, 84, 86 mesh with both the internal ring spurs of the ring gear 70 and the sun gear spurs of the sun gear 66. This number of spurs on each gear results in the control arm remaining static if the sun gear and the reference shaft gears are driven at the same angular speed and in the same direction.

Each planet gear 82, 84, 86 is mounted on a pivot to allow each planet gear 82, 84, 86 to rotate about its rotational axis 83, 85, 86. Each pivot is mounted on an O-shaped frame 88. A phase indicator arm 90 extends radially from the frame 80.

The ring gear 70 and the sun gear 66 are geared so that the speed of the internal ring spurs and the speed of the sun gear spurs are equal under normal operating conditions. Accordingly, under steady rotation of the ring gear 70 and the sun gear 66 each of the planet gears 82, 84, 86 rotate about their own axis but remain stationary with respect to the rotational axes 76, 78 of the ring gear 70 and the sun gear 66.

If a low voltage event occurs and the frequency of the prime mover shaft 20 changes with respect to the speed of the regulation shaft 28, thereby indicating a change in the power angle, then the rate of rotation of the sun gear 66 will alter accordingly with respect to the rate of rotation of the ring gear 70. This will result in movement of the planet gears 82, 84, 86 relative to the rotational axis 76 of the sun gear 66. The O-shaped frame 88 will therefore rotate about the axes of rotation 76, 78 of the sun gear 66 and the ring gear 70 resulting in movement of the phase indicator arm 90, thereby indicating a change in the power angle.

The phase indicator arm 90 will move to the left towards "A" in the case of an increase in relative speed of the prime mover 20. If the speed of the prime mover 20 is then restored to match that of the reference shaft 28 the phase indicator arm 90 will stop moving and will remain displaced to the left of its initial position, i.e. towards "A". If there is a decrease in the relative speed of the prime mover shaft 20 the control arm will move to the right towards "B". These movements are indicated by control arm arrow 96. Thus, the direct mechanical linkage between the prime mover shaft 20 (and hence, the rotor) and the regulation shaft 28 provides an immediate feedback signal as soon as there is a difference in angular position between the respective shafts. It can be seen that the amount of force available to the actuation linkage 90 (and e.g. control rod 92 as in FIG. 3) is proportional to the rate of change of relative angular momentum of the two shafts, which may lead to considerable force acting without delay due to the direct mechanical connection.

Since both the prime mover shaft 20 and the reference shaft 28 have significant rotational inertia by means of the mass of the power source and the flywheel of the synchronous motor, the phase indicator arm 90 also has considerable inertia which imparts to the phase indicator arm 90 a high resistance to external force. Therefore, the phase indicator arm 90 will not be affected by short duration transient events.

Figure 3:
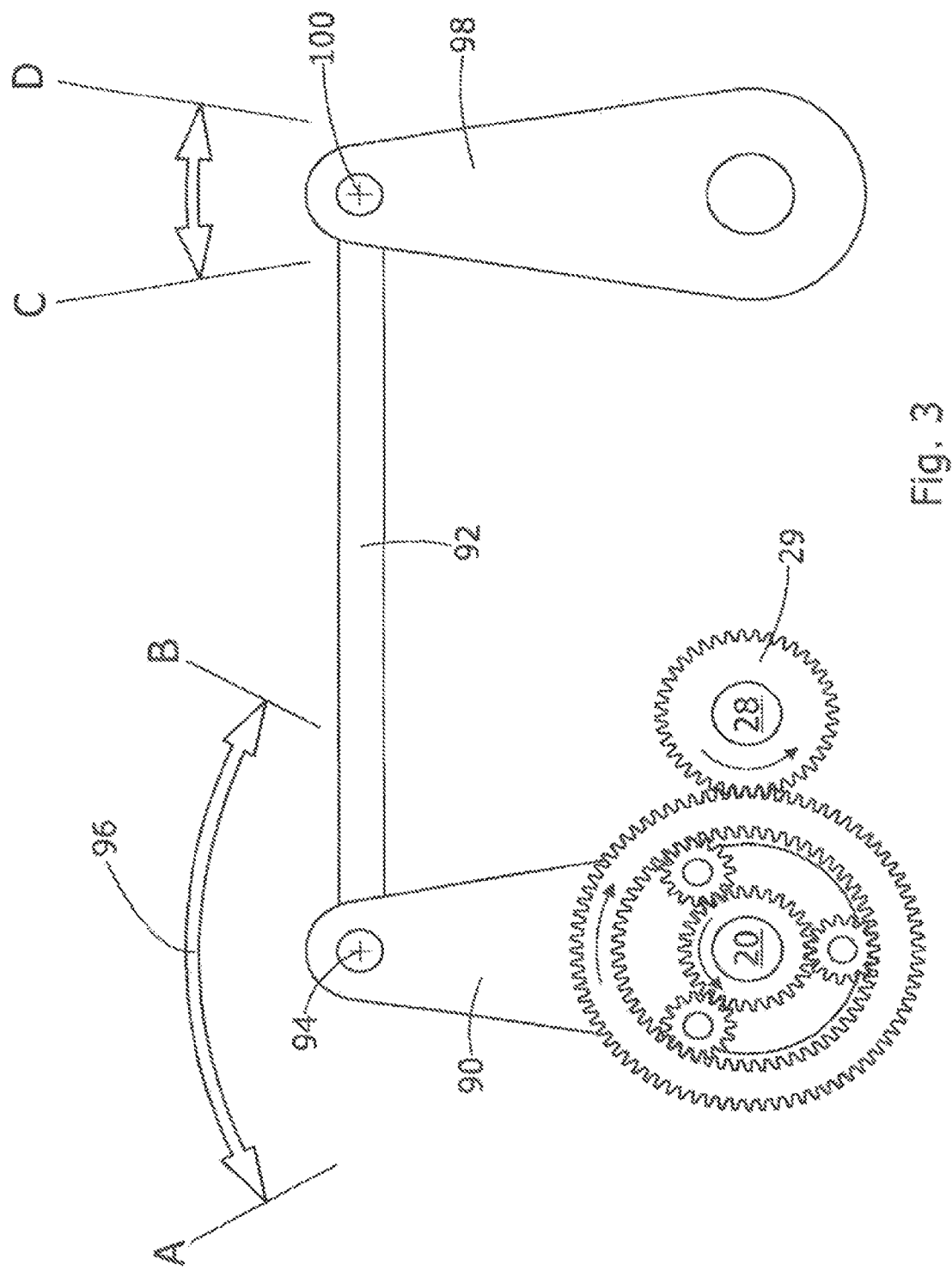
FIG. 3 is a diagram of the apparatus shown in FIG. 2 incorporating a control rod and a control lever.

In a further embodiment illustrated in FIG. 3, the phase indicator arm 90 is connected to a first end of a control rod 92 by a control pivot 94 located inboard of the end of the phase indicator arm 90. Movement of the phase indicator arm 90 translates to relative movement of the control rod 92. The second end of the control rod 92 is connected to a control arm 98, via a power arm pivot 100 that controls the power output of the power source, namely the PHES machine.

In alternative embodiments of the invention, the control rod 92 may be arranged with a throttle or other speed control device to regulate the power generated by the power source in response to a change in the relative speed of the prime mover 20.

The control arm 98 is configured such that movement towards the letter "D" increases the power delivered by the power source. Conversely, movement towards the letter "C" decreases the power delivered by the power source. This is particularly advantageous when used with an energy storage system, such as the PHES machine because an energy storage e.g. PHES machine is able to operate from full positive torque to full negative torque, i.e. full discharge to full charge (e.g. switching from generation mode to motor mode). This allows the electrical machine to operate in generator or motor modes as required, with regulation of the power angle being possible for both positive and negative power (torque) angles.

Power variations will be resisted by the rotational inertia of the power source. The direct coupling of the phase indicator arm 90 to the control arm 98 control lever gives a relationship between the angle of the phase indicator arm and the power delivered by the power source.

Accordingly, the control rod 92 and the control arm 98 is connected to the power control of the PHES machine to regulate the power generated by the PHES machine. For example, if the frequency of rotation of the prime mover 20 falls, the control rod 92 is arranged to increase the power produced by the PHES machine, and therefore increase the frequency of the prime mover shaft 20. Conversely, if the frequency of rotation of the prime mover shaft 20 rises, the control rod 92 is arranged to decrease the power produced by the PHES machine, and therefore the frequency of rotation of the prime mover 20.

An acceleration of the speed of the regulation gear 29 will result in a movement of the control lever 90 to the right thus increasing the power delivered by the PHES machine, thereby maintaining the correct power angle. This increase in power will result in a corresponding acceleration of the sun gear 66 which, in turn, will first stabilise the phase indicator arm 90 and then move it to the left (i.e. towards the letter "A"). This leftward movement will, via the control rod 92, move the control arm 98 to the left reducing the power delivered by the PHES machine. An equilibrium condition may therefore be found with the phase indicator arm 90 displaced towards the letter "A" and the control arm 98 demanding a power machine torque appropriate to the load. Therefore the apparatus is stable as the power is controlled such as to return the phase indicator arm 90 to a static condition.

Figure 4:
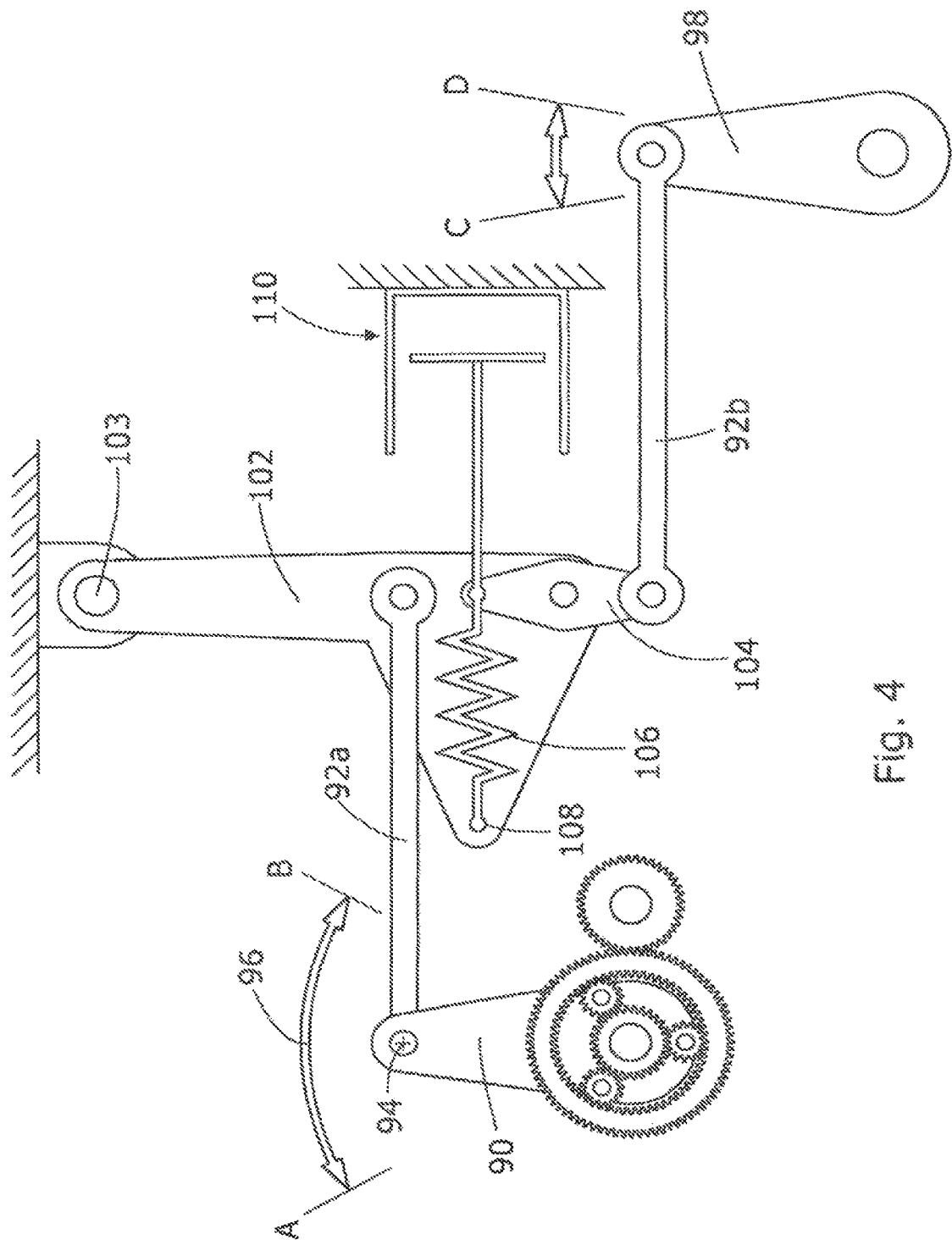
FIG. 4 is a diagram of the apparatus of FIG. 3 incorporating a first damping mechanism.

FIG. 4 illustrates a means of providing a damped response to any changes in power angle which serves to increase stability of the apparatus. In the embodiment shown in FIG. 4, a first control rod 92a is connected at a first end to the phase indicator arm 90 and at a second end to a swing arm 102. A first end of the swing arm 102 is earthed and fixed to a swing arm pivot 103 to enable the swing arm 102 to swing. The second end of the first control rod 92a is pivotally linked to the swing arm 102 partway along the length of the swing arm 102. A rocker link 104 is located at the second end of the swing arm 102. The rocker link 104 carries a spring 106 between its upper end and an a first attachment point 108 on the swing arm 102. An earthed damper 110, such as a viscous or other form of damper, for example a dashpot, is also connected to the upper end of the rocker link 104. The lower end of the rocker link 104 is pivotally attached to a first end of the second control rod 92b, the second end of which is connected the control arm 98.

If the phase indicator arm 90 is in motion then, by virtue of its attachment to the swing link 102, the swing arm 102 will also be in motion. This, in turn, results in motion of the rocker link 104. The connection of the rocker link 104 to the damper 110 results in an augmented motion of the control arm 98 in proportion to the rate of movement of the phase indicator arm 90.

The arrangement of the velocity-related components shown in FIG. 4 results in the three terms of the implicit equation of motion of the system: inertial, velocity and displacement, all acting to reduce any perturbation applied to the system. By appropriate selection of mechanical advantage between the phase indicator arm 90 and the control arm 98, damping coefficient and system inertia in the system are stabilised in accordance with principles well known to the skilled person.

Figure 5:
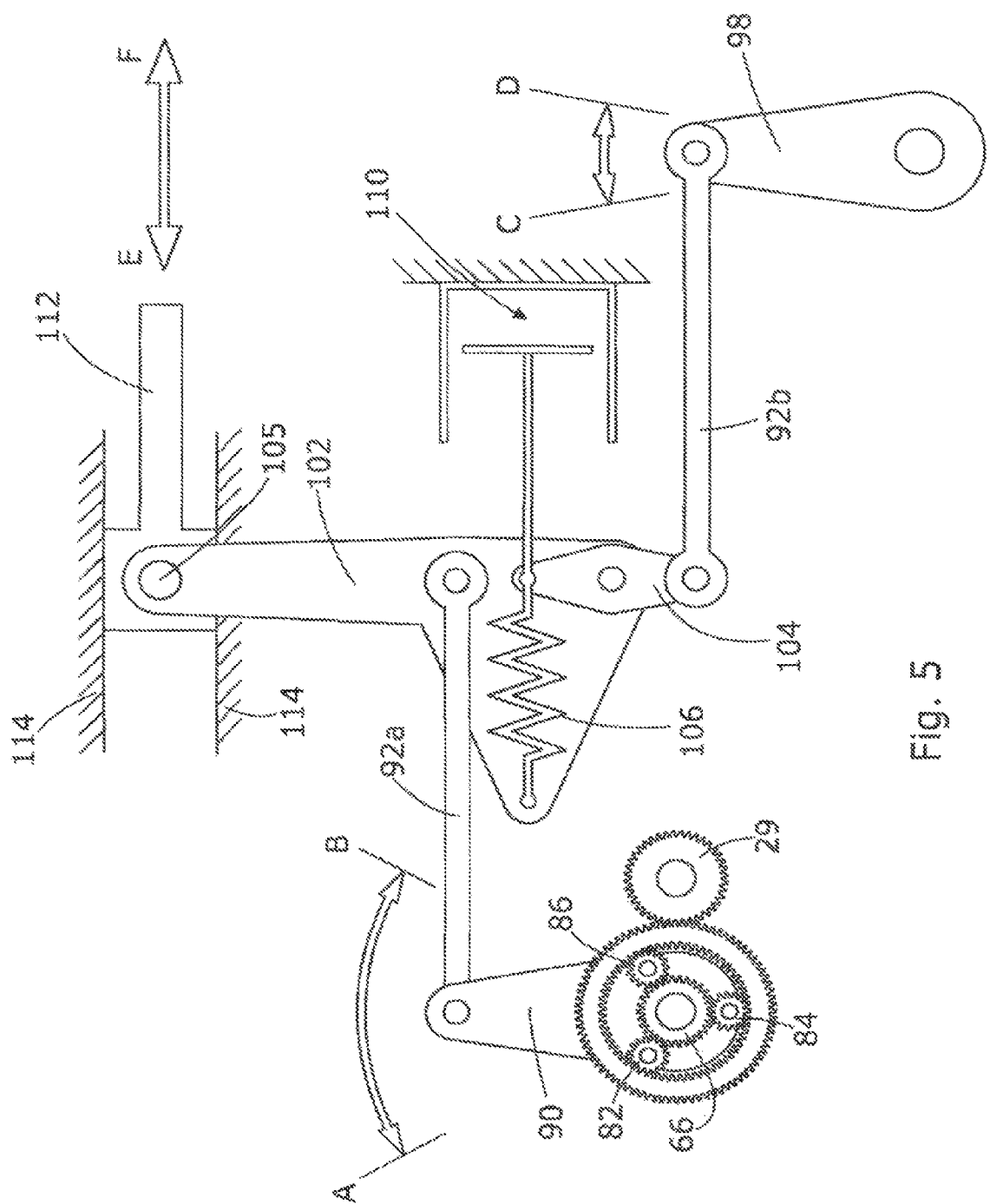
FIG. 5 is a diagram of the apparatus of FIG. 4 incorporating a control mechanism for adjusting the desired power angle.

FIG. 5 illustrates a means of providing control of desired phase angle (e.g. desired power setting) according to a further embodiment of the invention. This embodiment is particularly useful if an PHES system is driving, or being driven by, an electrical machine connected to a frequency regulated power distribution system, for example.

Rather than being pivotally secured to a static earthed pivot point, the swing arm 102 is secured to a sliding member 112 via a pivot 105. The sliding member 112 is located within a slideway 114. The sliding member 112 enables slidable movement of the pivot 105. As illustrated in FIG. 5, if the pivot 105 is moved via the control rod 92a in the direction indicated by the letter "E" the control arm 98 will move towards the letter "D" decreasing the delivered power. This will cause the phase indicator arm 90 to move towards the letter "A" which, via the rocker link 104, will cause the control lever 98 to move towards the letter "C" reducing the delivered power. This process continues until equilibrium is restored and the phase indicator arm 90 is static and displaced towards the letter "A" from its original location.

Since the control rod 92a linking the swing arm 102 and the phase indicator arm 90 is rigidly linked to the phase indicator arm 90, any movement of the swing arm pivot 105 is transmitted immediately to the control arm 98 via the rocker link 104. As already described, this perturbation will result in ultimate stabilisation of the phase indicator arm 90 in a position different from its condition prior to the perturbation. A means of control of phase angle between the power source and the reference shaft is thus achieved.

Figure 6:
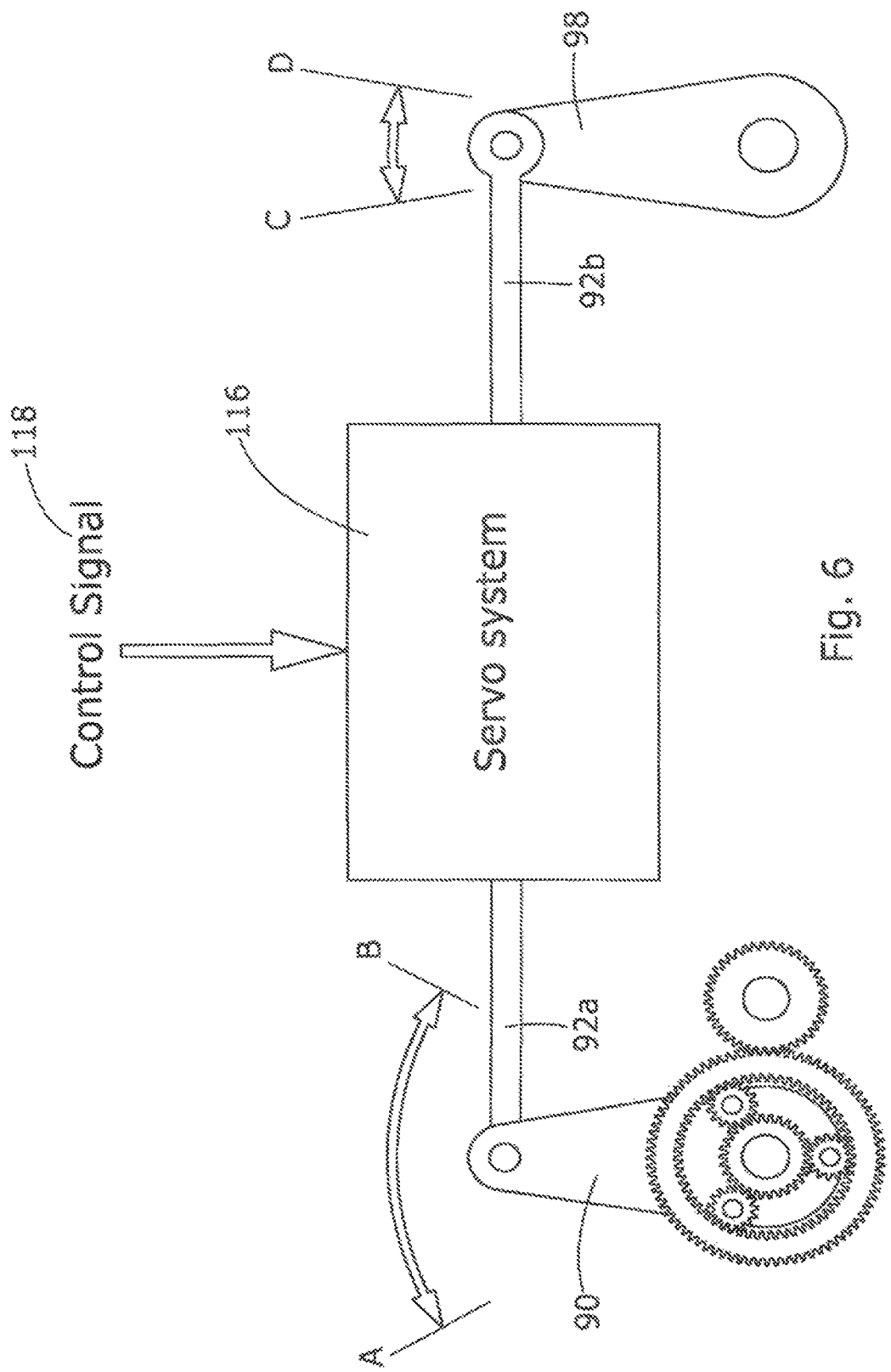
FIG. 6 is a diagram of the apparatus of FIG. 2 incorporating alternative control apparatus.

FIG. 6 schematically illustrates the linking of the control arm 98 to the phase indicator arm 90 by means of a servo control system 116, as opposed to a mechanical control linkage. The requirements for stable motion and position holding are well known and are typically defined by means of an equation of motion of the form:

$$A\ddot{x}++C\dot{x}+D=0$$

Where:
A=Inertia coefficient (typically linear or angular inertia)
B=Damping coefficient (typically damping force or torque as a function of linear or angular velocity)
C=Displacement coefficient (typically force per unit displacement, either angular or linear, i.e. stiffness)
D=Offset coefficient. The value of this coefficient may be a fixed characteristic of the system or may be the output of a control demand
$\ddot{x}$=Acceleration (angular or linear)
$\dot{x}$=Velocity (angular or linear)
x=Displacement (angular or linear)

The relationship between the angular movement of the control arm 98 and the angular movement of the phase indicator arm 90 may be controlled by the servo system 116. The servo system 116 may comprise electronic, hydraulic, pneumatic or other means or a combination of these means that addresses the terms of the equation of motion of the above form to control the relationship between the control arm 98 and the phase indicator arm 90 in a stable manner. A control signal 118 is provided which relates to the predetermined or desired power angle (i.e. desired power requirement). Therefore, the mechanical system described previously may be replaced by a servo control system performing the same functions.

In a further alternative embodiment, the motor shaft 20 of the first embodiment of the invention is geared with the ring gear 70 and the regulation shaft 28 is geared with the sun gear 66. In this alternative embodiment the movement of the phase indicator arm 90, and the further elements of the invention described herein with reference to FIGS. 2 to 6 is reversed.

It will be clear to the skilled person that modifications may be made to the above described systems or methods, including combining elements of one or more of the above described embodiments and/or aspects of the invention, without departing from the scope of the invention as set out in the following claims.

The invention claimed is:

1. Apparatus for transmitting energy, the apparatus comprising:
an electrical machine arranged to convert between electrical energy and mechanical energy, the electrical machine being powered by a power source and comprising a rotor;
a signal generator arranged to generate a reference signal relating to a predetermined power angle; and
a control mechanism pivotably connected to the signal generator and the rotor and arranged to regulate motion of the rotor to ensure that a power angle of the electrical machine is maintained within a range of the predetermined power angle,
wherein the control mechanism comprises a control member connected to a power control apparatus of the power source, and
wherein a change in relative movement between the signal generator and the rotor is reflected in a position or movement of the control member resulting in a relative change in an output of the power source.

2. The apparatus of claim 1, wherein the signal generator is powered by a frequency regulated electrical supply.

3. The apparatus of claim 1, wherein the apparatus comprises a damping system for damping regulation of the rotor.

4. The apparatus of claim 1, wherein the rotor is connected or coupled to a prime mover shaft.

5. The apparatus of claim 4, wherein the prime mover shaft is arranged to absorb or transmit mechanical power.

6. The apparatus of claim 4, wherein the prime mover shaft is a drive shaft or crank shaft.

7. The apparatus of claim 1, wherein a change in the motion of the rotor is transmitted into a relative change in the output of the power source.

8. The apparatus of claim 1, wherein the control mechanism directly controls the power control apparatus of the power source.

9. The apparatus of claim 1, wherein the control member comprises a regulation shaft arranged to regulate the output of the power source.

10. The apparatus of claim 9, wherein the regulation shaft and the rotor are connected via the control mechanism.

11. The apparatus of claim 9, wherein the regulation shaft and the rotor are connected to a control arm by a planetary gear system.

12. The apparatus of claim 1, wherein the apparatus comprises an energy storage system.

13. The apparatus of claim 12, wherein the energy storage system is a pumped heat electricity storage (PHES) machine.

14. The apparatus of claim 1, wherein the apparatus is arranged to:
supply electricity to an electricity distribution system; or
store energy supplied by the electricity distribution system.

15. The apparatus of claim 1, wherein the signal generator comprises a synchronous motor.

16. The apparatus of claim 15, wherein the signal generator comprises a flywheel driven by the synchronous motor.

17. The apparatus of claim 1, wherein the electrical machine is powered by electricity from a power grid and the apparatus comprises an energy storage system, and wherein the control mechanism is arranged to control the energy storage system and maintain the power angle of the electrical machine within a range of a power angle of the power grid.

18. The apparatus of claim 1, wherein the electrical machine is configured to run only as an electricity generator, or to run as a combination motor-generator that changes between a motor mode and a generator mode.

19. A method of transmitting energy, the method comprising:
- rotating a rotor of an electrical machine using power generated by a power source, the electrical machine being arranged to convert between electrical energy and mechanical energy, and the electrical machine being powered by the power source, wherein the electrical machine forms part of an apparatus that further comprises a signal generator and a control mechanism, the control mechanism being pivotably connected to the signal generator and the rotor, and the control mechanism comprising a control member connected to power control apparatus of the power source;
- generating a reference signal relating to a predetermined power angle using the signal generator; and
- regulating motion of the rotor with the control mechanism so that a power angle of the electrical machine is maintained within a range of the predetermined power angle, wherein a change in relative movement between the signal generator and the rotor is reflected in a position or movement of the control member and results in a relative change in an output of the power source.

* * * * *